Sept. 27, 1932.     F. B. THOMAS     1,879,642
FLUID PRESSURE BRAKE
Filed Oct. 9, 1931
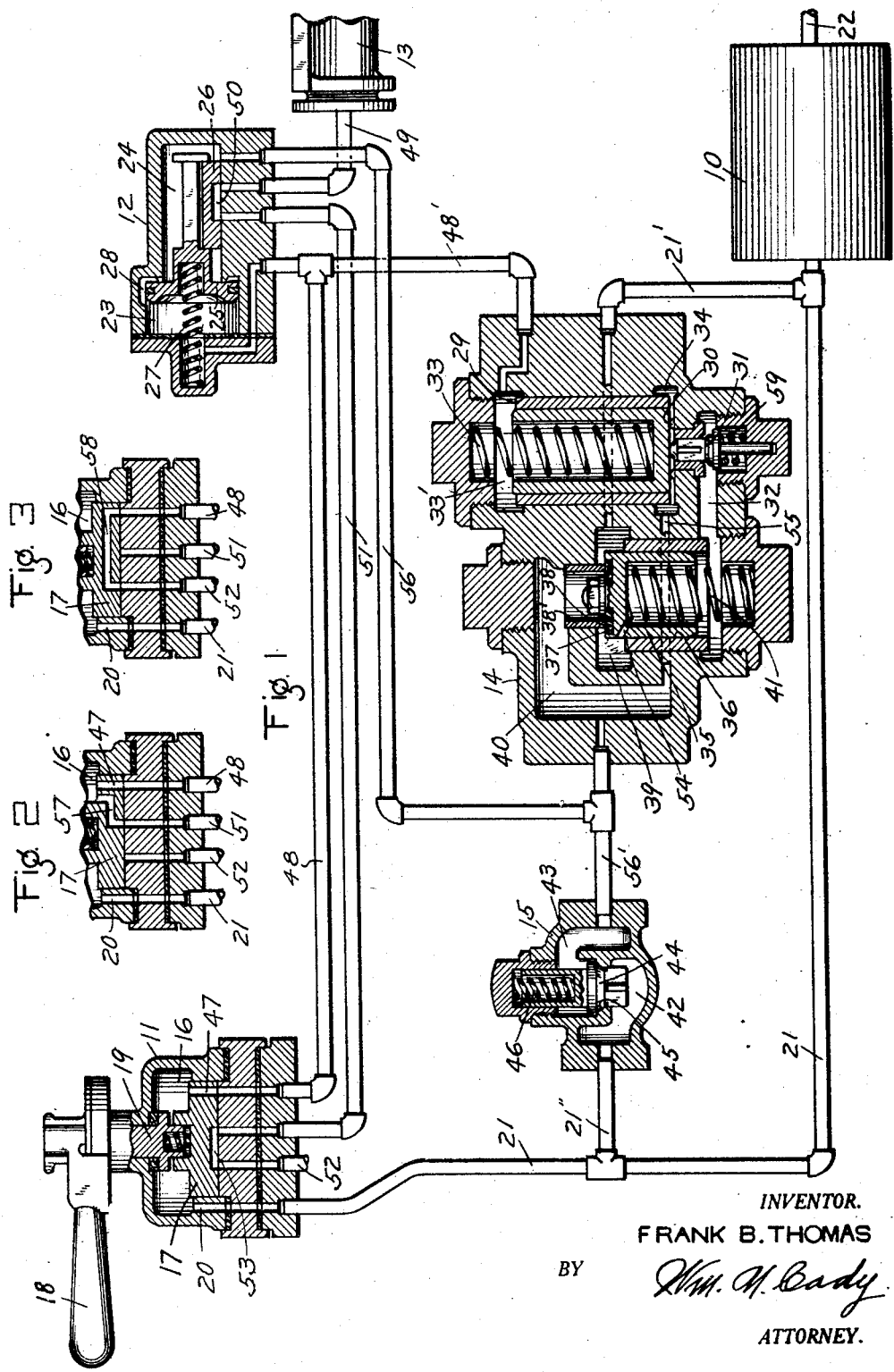
INVENTOR.
FRANK B. THOMAS
BY
Wm. H. Cady
ATTORNEY.

Patented Sept. 27, 1932

1,879,642

UNITED STATES PATENT OFFICE

FRANK B. THOMAS, OF FOREST HILLS, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 9, 1931. Serial No. 567,797.

This invention relates to fluid pressure brakes and more particularly to a combined straight air and automatic emergency brake equipment.

The primary object of the present invention is the provision in a fluid pressure brake system of valve means for regulating and limiting the brake cylinder pressure in an emergency application of the brakes.

A further object resides in the inclusion in a brake system, of the above mentioned type, of safety means in the form of a check valve adapted to operate upon failure of the regulating or pressure limiting valve to function properly.

Other objects and advantages will appear from the following description of an illustrative embodiment of the present invention.

In the drawing; Fig. 1 is a diagrammatic view, with the principal parts in section, of a fluid pressure brake equipment, embodying my invention; Fig. 2 is a sectional view of the brake valve device, showing the rotary valve in service application position; and Fig. 3 is a sectional view of the brake valve device, showing the rotary valve in emergency position.

The brake equipment chosen for illustrative purposes, as shown in the accompanying drawing, comprises a main reservoir 10, a brake valve device 11, an emergency valve device 12, a brake cylinder 13, a pressure limiting valve device 14, and a check valve device 15. The several elements are connected by suitable piping and their relative positions and functions will be hereinafter described.

The brake valve device 11 is of well known type and comprises a casing having a fluid pressure chamber 16 containing a rotary valve 17 adapted to be manually operated by a handle 18 which is connected to the valve 17 by a stem 19. A passage 20 leads from the chamber 16 and is connected to the main reservoir 10 by piping 21. The reservoir 10 is supplied with fluid under pressure, from any suitable source, through a pipe 22. It will readily be seen that the chamber 16 in the brake valve device 11 is constantly maintained at main reservoir pressure.

The emergency valve device 12 comprises a casing having a longitudinal bore which forms a piston chamber 23 and a valve chamber 24. The chamber 23 contains a piston 25 and the chamber 24 contains a slide valve 26 adapted to be to be actuated by movement of the piston 25. A coil spring 27 urges the piston 25 to the position shown in Figure 1 of the drawing and when the piston 25 is in this position, a feed groove 28 serves to establish communication between chambers 23 and 24.

The pressure limiting valve device comprises a casing containing a bore 29 within which a piston 30 is mounted. The piston 30 is adapted to control the operation of a valve 31 contained in a valve chamber 32. A coil spring 33 contained in a chamber 33' urges the piston 30 downwardly to tend to unseat the valve 31. The valve 31 controls communication between the chamber 32 and a chamber 34 formed at the other side of the piston 30. A valve piston 35 is mounted in a bushing 36. One side of the valve piston 35 is open to the chamber 32, while the opposite side carries a seat 37 adapted to engage a seat rib 38 carried by a bushing 38' which extends into a chamber 39 for controlling communication from chamber 39 to a chamber 40. A coil spring 41 urges the valve piston 35 upwardly to cause the seat 37 to engage the seat rib 38.

The safety valve 15 comprises a casing having a pair of chambers 42 and 43. Communication between the chambers is controlled by a valve 44 which is urged against a seat 45 by a spring 46.

In operation, fluid under pressure is supplied to the main reservoir 10 in the usual manner through pipe 22, and is delivered from the main reservoir to the pressure chamber 16 of the brake valve device and pressure chamber 39 of the pressure limiting valve device 14 through pipes 21 and 21', respectively.

With the brake valve device 11 in release position, as shown in Figure 1 of the drawing, fluid under pressure flows from the chamber 16 through a port 47 in the rotary valve 17 and an emergency brake pipe 48 to the piston chamber 23 in the emergency valve device 12. The piston 25 will be moved to its extreme right hand position under the influence of the fluid pressure in the chamber 23 and cause the slide valve 26 to be moved to the position shown in the drawing. A branch 48' of the emergency brake pipe 48 is connected to the chamber 33' in the pressure limiting valve device 14 for the purpose of normally retaining the piston 30 in its lowermost position for a purpose to be hereinafter described.

With the slide valve 26 in the position shown in the drawing, the brake cylinder 13 is vented to the atmosphere through pipe 49, a cavity 50 formed in the slide valve 26, a straight air pipe 51 to a pipe 52 through a cavity 53 formed in the rotary valve 17 of the brake valve device 11. The venting of the brake cylinder 13 to the atmosphere will cause the release of the brakes in the usual manner.

Fluid under pressure which is delivered to the chamber 39 of the pressure limiting valve 14 passes through a restricted passage 54 formed in the piston 35 and flows to chamber 40 through chamber 32, past the open valve 31, through chamber 34 and a passage 55. From chamber 40 fluid flows through a pipe 56 to the valve chamber 24 of the emergency valve device 12.

To effect a service application of the brakes, the rotary valve 17 is moved by operating the handle 18 to the service position (as shown in Fig. 2). In service position of the valve 17, a port 57 establishes communication between the pressure chamber 16 and the brake cylinder 13 through the straight air pipe 51, cavity 50 in the slide valve 26 and a pipe 49, so that fluid under pressure is supplied to the brake cylinder 13 to cause a service application of the brakes.

To release the brakes after a service application, the valve 17 is moved to release position (shown in Fig. 1), so that fluid is vented from the brake cylinder 13 through pipe 51 in a manner previously described.

To effect an emergency application of the brakes, the valve 17 of the brake device 11 is moved to emergency application position, as shown in Fig. 3, in which the emergency brake pipe 48 is connected through a cavity 58 formed in the rotary valve 17 with the atmospheric exhaust pipe 52, causing a reduction in pressure in the brake pipe 48 and thus in the piston chamber 23 of the emergency valve device 12 and also in the chamber 33' in the pressure limiting valve device 14. The piston 25 will then be shifted to the left under the pressure of the fluid in the valve chamber 24 which is sufficient to overcome the resistance of the coil spring 27. The leftward movement of the piston 25 carries the slide valve 26 to its emergency position in which the valve chamber 24 and brake cylinder 13 are in open communication through the pipe 49 so that fluid under pressure is delivered to the brake cylinder 13 from the valve chamber 24. Fluid under pressure is initially supplied to the valve chamber 24 from the main reservoir 10, through pipe 21', chamber 39, through restricted port 54 in the valve piston 35, chamber 32, past the normally open valve 31, through the passage 55, to chamber 40, and thence through pipe 56 to the valve chamber 24. The pressures in chambers 32, 40, and 24 are reduced by the flow of fluid to the brake cylinder and the reduction in pressure in the chamber 32 below the valve piston 35, permits the main reservoir pressure, acting on the exposed area of the valve piston 35 in the chamber 39 to overcome the pressure of spring 41, so that the valve piston 35 is shifted to its lower position causing the valve seat 37 to move from the seat rib 38. A large opening is thus provided which permits a rapid flow of fluid from the main reservoir 10 through pipe 21', chamber 39, past the unseated valve to chamber 40, and thence through pipe 56, valve chamber 24 and through pipe 49 to the brake cylinder 13.

The pressure of fluid supplied to the brake cylinder acts in chamber 34 on the lower end of the piston 30. When the pressure of fluid flowing to the brake cylinder 13 through chamber 34, reaches a predetermined degree slightly exceeding the resistance of the spring 33, the piston 30 is moved upwardly, permitting the valve 31 to seat under the action of a spring 59. After the valve 31 has been seated the pressure in the chamber 32 will be built up through the restricted passage 54 in the valve piston 35. As the pressure in chamber 32 approaches that of chambers 39 and 40, the coil spring 41 will cause the valve piston 35 to move upwardly and force the seat 37 into engagement with the seat rib 38 to cut off communication between the reservoir 10 and the brake cylinder 13.

Should leakage occur in the brake cylinder 13, the pressure acting in chamber 34 will be correspondingly reduced until the pressure of the spring 33 is sufficient to overcome the reduced pressure in chamber 34, when the piston 30 will be moved downwardly to unseat the valve 31, to vent the chamber 32. The fluid pressure in chamber 35 will then be sufficient to overcome the spring 41 and the piston 35 will move downwardly to open communication between chambers 39 and 40 and permit a further supply of fluid under pressure from the reservoir to the brake cylinder. In this manner pressure will be maintained in the brake cylinder 13 and communicating chambers at a pressure determined by the spring 33 in the manner previously set forth.

A safety check valve device 15 is provided in the system and connected in parallel with the pressure limiting valve device 14. The compression of spring 46 contained in the safety valve device 15 is such that under normal conditions the safety valve remains inoperative.

In case of failure of the spring 33, the valve 31 will seat under the action of the spring 59 and cause fluid at main reservoir pressure to be present in the chamber 32. This condition will preclude the movement of the piston 35 when the brakes are applied and thus prevent the flow of fluid at main reservoir pressure to pass through the pressure limiting valve device 14.

In the event of a brake application, after the spring 33 has failed, fluid under pressure would flow from the main reservoir 10 through pipes 21 and 21″, into the chamber 42 of the safety valve device 15. The pressure of fluid in chamber 42 would act upon the lower face of the valve 44 and cause it to be raised from its seat 45 against the resistance of the spring 46 and thus permit a flow of fluid through the chamber 43, pipes 56′ and 56 to the emergency valve device 12 and thence to the brake cylinder. As the pressure in the chamber 43 approached the reservoir pressure the spring 46 would act upon the valve 44 to seat the same to cut off further reservoir supply to the brake cylinder and limit the brake cylinder pressure to the desired amount. Upon depletion of the pressure in the brake cylinder the valve 44 would again open to supply fluid under pressure and again close in the manner above described to limit the brake cylinder pressure. Obviously the pressure necessary to overcome the spring 46 would have to be slightly greater than that necessary to overcome the spring 33 in the pressure limiting valve device 14, in order that the system normally be under the control of the pressure limiting valve. The sole purpose and function of the safety check valve device 15 is to insure proper operation of the system upon failure of the pressure limiting valve.

To release the brakes from an emergency application position the rotary valve 17 of the brake valve device 11 is moved to the release position and the pressure in the brake cylinder is vented in the usual manner to release the brakes.

It will readily be seen from the foregoing description that valve means have been provided in a fluid pressure brake system employing straight air for brake control wherein different pressures, for use in service and emergency applications of the brakes, are made available from a single pressure reservoir. And furthermore, that the pressure available for an emergency application of the brakes is limited to a definite amount and may be maintained through the automatic operation of the pressure limiting valve in spite of leakage losses in the system.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. In a fluid pressure brake, the combination with a brake cylinder, a brake pipe, and a valve device operated upon a reduction in brake pipe pressure for supplying fluid under pressure from a chamber to the brake cylinder, of a source of fluid under pressure from which fluid is supplied to said chamber through a restricted port and valve means subject to the pressure of fluid in said chamber and operated upon a reduction of pressure in said chamber for opening a communication through which fluid is supplied from said source to said chamber.

2. In a fluid pressure brake, the combination with a brake cylinder, a brake pipe, and a valve device operated upon a reduction in brake pipe pressure for supplying fluid under pressure from a chamber to the brake cylinder, of a source of fluid under pressure, and valve means subject to the pressure of fluid supplied to said chamber and having a restricted communication through which fluid is supplied from said source to said chamber and operated upon a reduction in pressure in said chamber for opening a large communication through which fluid is supplied from said source to said chamber.

3. In a fluid pressure brake, the combination with a brake cylinder, a brake pipe, and a valve device operated upon a reduction in brake pipe pressure for supplying fluid under pressure from a chamber to the brake cylinder, of a main reservoir normally charged with fluid under pressure and valve means subject to the pressure of fluid in said chamber and having a restricted communication through which fluid is supplied from said reservoir to said chamber and operated upon a reduction in pressure in said chamber by flow to the brake cylinder for opening a large communication through which fluid is supplied from the main reservoir to said chamber.

4. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber to the brake cylinder, of means for supplying fluid under pressure to said chamber at a restricted rate, valve means subject to the pressure of fluid in said chamber and operated upon a reduction in pressure in said chamber to open a large communication through which fluid is supplied from the main reservoir to said chamber, and means operated upon a predetermined increase in pressure in said chamber for operating said valve means to close said large communication.

5. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber to the brake cylinder, of means for supplying fluid under pressure to said chamber at a restricted rate, valve means subject to the pressure of fluid in said chamber and operated upon a reduction in pressure in said chamber to open a large communication through which fluid is supplied from the main reservoir to said chamber, and valve mechanism operated upon a predetermined increase in pressure in said chamber for cutting off communication from said chamber to said valve means.

6. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber to the brake cylinder, of valve means subject to the flow of fluid through a restricted port from the main reservoir to said chamber and operated upon a reduction in fluid pressure at a greater rate than fluid can flow through said restricted port for opening a large communication through which fluid is supplied from the main reservoir to said chamber, and a valve mechanism operated upon a predetermined increase in pressure in said chamber for cutting off the flow of fluid through said restricted port to said chamber, to thereby cause said valve means to be operated to cut off communication through said large communication from the main reservoir to said chamber.

7. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber in said emergency valve to said brake cylinder, of a pressure limiting valve device, a pressure responsive valve means in said last named valve device actuated upon an emergency application of the brakes for interrupting the normal flow of fluid through said pressure limiting valve device, and a second pressure responsive valve means for establishing communication between said main reservoir and said brake cylinder through said pressure limiting valve device, said first named pressure responsive valve means serving to limit the pressure obtainable in said brake cylinder.

8. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber in said emergency valve to said brake cylinder, of a pressure limiting valve device, said pressure limiting valve device functioning in an emergency application of the brakes to cause said emergency valve device to operate to supply fluid under pressure from said reservoir to said brake cylinder and to limit the pressure obtainable in said brake cylinder.

9. In in a fluid pressure brake, the combination with a main reservoir normally charged with fluid under pressure, a brake cylinder, a brake pipe, and an emergency valve device operated upon a reduction in brake pipe pressure for supplying fluid under pressure from a chamber in said emergency valve to said brake cylinder, of a presssure limiting valve device, and a check valve, said check valve being in parallel connection with said pressure limiting valve to provide a means for supplying fluid under pressure to said brake cylinder upon failure of said pressure limiting valve device.

10. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber in said emergency valve to said brake cylinder, of a pressure limiting valve device, a pressure responsive valve means in said last named valve device actuated upon an emergency application of the brakes for interrupting the normal flow of fluid through said pressure limiting valve device, and a second pressure responsive valve means for establishing communication between said main reservoir and said brake cylinder through said pressure limiting valve device, said first named pressure responsive valve means serving to limit the pressure obtainable in said brake cylinder, and a check valve, said check valve being in parallel connection with said pressure limiting valve to provide a means for supplying fluid under pressure to said brake cylinder upon failure of said pressure limiting valve device.

11. In a fluid pressure brake, the combination with a main reservoir normally charged with fluid under pressure, a brake cylinder, a brake pipe, and an emergency valve device operated upon a reduction in brake pipe pressure for supplying fluid under pressure from a chamber in said emergency valve to said brake cylinder, of a pressure limiting valve device, and pressure limiting valve device functioning in an emergency application of the brakes to cause said emergency valve device to operate to supply fluid under pressure from said reservoir to said brake cylinder, and to limit the pressure obtainable in said brake cylinder, and a check valve, said check valve being in parrallel connection with said pressure limiting valve to provide a means for supplying fluid under pressure from said main reservoir to said brake cylinder upon failure of said pressure limiting valve.

In testimony whereof I have hereunto set my hand, this 6th day of October, 1931.

FRANK B. THOMAS.